April 26, 1938.   E. E. HEWITT   2,115,523
HIGH SPEED BRAKE EQUIPMENT
Filed May 4, 1937   2 Sheets-Sheet 2
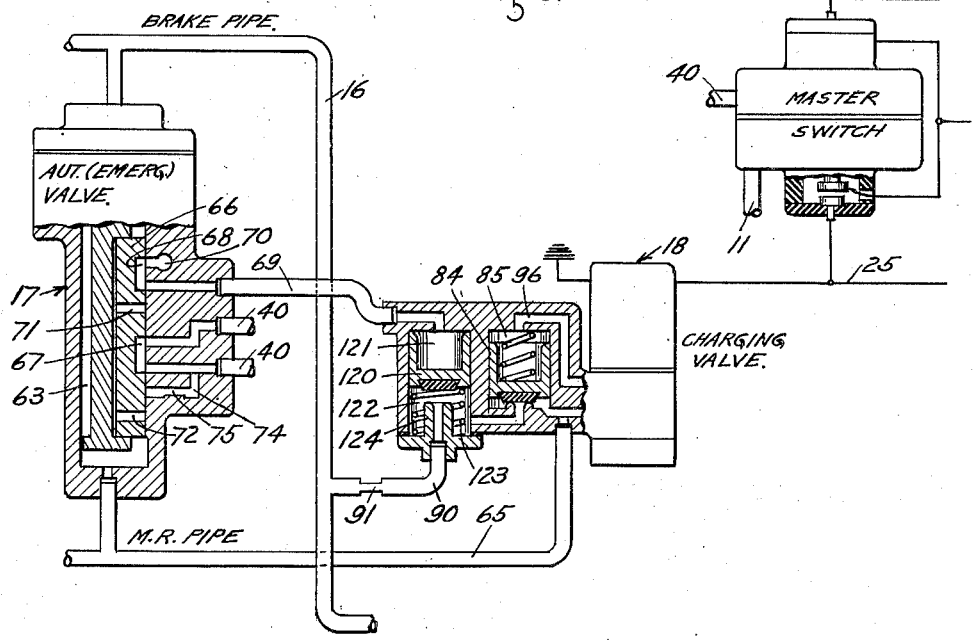
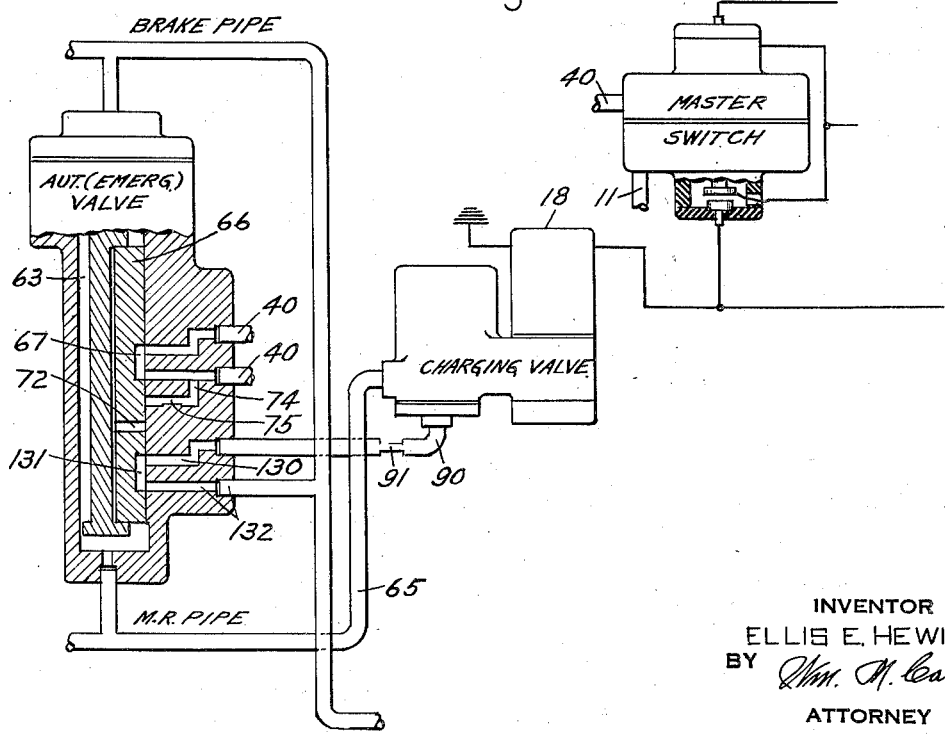
INVENTOR
ELLIS E. HEWITT
BY Wm. H. Cady
ATTORNEY Patented Apr. 26, 1938

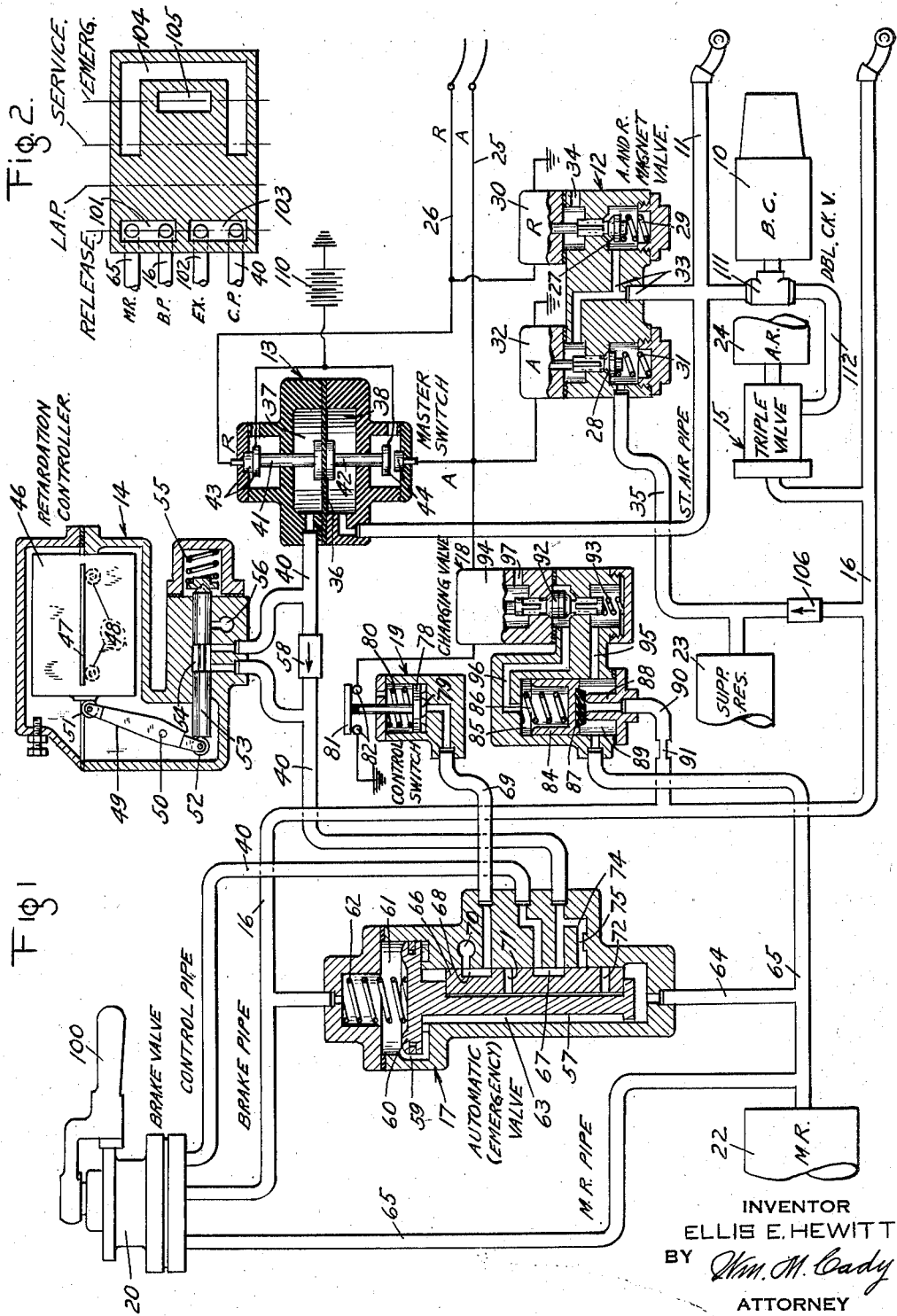

2,115,523

UNITED STATES PATENT OFFICE 2,115,523

HIGH SPEED BRAKE EQUIPMENT

Ellis E. Hewitt, Edgewood, Pa., assignor to The Westinghouse Air Brake Company, Wilmerding, Pa., a corporation of Pennsylvania Application May 4, 1937, Serial No. 140,596

17 Claims. (Cl. 303—15)

This invention relates to high speed brake equipments, and more particularly to brake equipments intended for railway trains and traction vehicles which normally operate at relatively high speeds.

Brake equipments have heretofore been proposed for high speed trains in which applications of the brakes may be effected either by straight air operation or by automatic operation. The portion of the equipment providing for straight air operation has included a fluid pressure operated master switch device which controls the energization and deenergization of application and release conductors extending throughout the train. These conductors control the operation of application and release magnet valve devices located on the several cars of the train, which in turn control the supply of fluid under pressure to and its release from the brake cylinders on the several cars.

The portion of the brake equipment providing for automatic operation has included a normally charged pipe, sometimes referred to as a brake pipe, or an emergency pipe, and valve devices which operate upon a reduction of pressure in this pipe to also control the supply of fluid under pressure to and its release from the brake cylinders on the several cars. Both the reduction of pressure in the normally charged pipe and the supply of fluid under pressure to operate the master switch device are controlled by a single engineer's brake valve device.

When the operating handle of the engineer's brake valve device is moved to a service application position to supply fluid under pressure to operate the master switch device, charging of the normally charged pipe is interrupted. In order that this charging may be maintained during a service or straight air operation of the brakes, an electrically operated valve device is provided connected to the application conductor, and operated when this conductor is energized to open a communication through which fluid under pressure is supplied to the normally charged pipe to maintain it charged to its normal pressure value.

In one of the first of the equipments designed and put in service on a high speed train, the straight air portion and the automatic portion of the brake equipment were not concurrently operable. That is to say, either the automatic portion or the straight air portion was effective at one time, but not both simultaneously. It was later recognized that from a safety standpoint the two portions should be concurrently operable whenever an emergency application of the brakes was initiated, so that one or the other of the two portions would be fully effective in producing an application of the brakes.

In equipments providing for concurrent operation of the straight air and automatic portions, and having the above referred to charging, electrically-operated, valve device, this means that when an emergency application is effected, and both the straight air and automatic portions are operated, fluid under pressure will be supplied to the normally charged pipe at the same time fluid under pressure is being released therefrom, so that an undue loss of fluid results. This therefore presented a problem which required a simple and effective solution.

The present invention contemplates a solution of this problem by providing a brake equipment in which applications may be effected by either straight air (electropneumatic) operation, or by automatic operation, and in which the normally charged pipe forming a part of the automatic portion of the equipment is maintained charged from other than the brake valve device during straight air applications of the brakes, and in which this charging function is rendered ineffective during emergency applications of the brakes when both the straight air and automatic portions are operated.

In addition to the foregoing object, the invention further contemplates the provision of several specific means for controlling the charging of the normally charged pipe of a brake system of the type hereinbefore referred to, in which whenever pressure is intentionally reduced in the normally charged pipe to effect an application of the brakes, the charging of the pipe from a point other than at the engineer's brake valve is prevented.

Other objects and advantages of the invention will be more fully appreciated from the following description, which is illustrated by the attached drawings, wherein, Fig. 1 shows in schematic and diagrammatic form an adaptation of the invention as applied to the head end or control car of a train.

Fig. 2 is a diagrammatic view showing the communications controlled by the engineer's brake valve shown in Fig. 1.

Fig. 3 shows a portion of the brake equipment of Fig. 1 illustrating a modification in the means for controlling the charging valve of Fig. 1.

Fig. 4 shows a further modification in the means for controlling the functioning of the charging valve.

In Fig. 1 I have illustrated in its simplest form a combined straight air and automatic brake equipment, commonly referred to as the "HSC" equipment, and more particularly described and claimed in my copending application Serial No. 741,063, filed August 23, 1934. Only so much of that equipment has been illustrated as is necessary to understand the present invention.

As illustrated, the equipment includes a brake cylinder 10, a straight air pipe 11, an application and release magnet valve device 12, a fluid pressure operated master switch device 13, a retardation controller device 14, a triple valve device 15, a normally charged pipe 16 (which will hereinafter be referred to as a brake pipe) an automatic or emergency valve device 17, a charging valve device 18, a control switch device 19, and an engineer's brake valve device 20. The various supply reservoirs for the brake system include a main reservoir 22, a supply reservoir 23, and an auxiliary reservoir 24.

Considering now in detail the devices and apparatus above enumerated, while the equipment is illustrated for a single car only it will be understood that each car will be provided with one or more brake cylinders 10, and that each car will also have an application and release magnet valve device 12. Straight air pipe 11 and the brake pipe 16 will both extend throughout the train from car to car. In addition, an application conductor 25 and a release conductor 26 will also extend throughout the train and connect to the application and release electromagnets of the various application and release magnet valve devices 12.

Each of the application and release magnet valve devices 12 include a release valve 27 and a supply or application valve 28. The release valve 27 is urged toward a seated position by a spring 29, and is actuated to an unseated position by an electromagnet 30 when energized. Similarly, the application or supply valve 28 is urged toward a seated position by a spring 31 and is actuated to an unseated position by an electromagnet 32 when energized.

When the application valve 28 is seated, and the release valve 27 is unseated, communication is established between the straight air pipe 11 and the atmosphere, by way of pipe and passage 33 and exhaust port 34. When the release valve 27 is seated this communication is closed, and when at the same time the application valve 28 is unseated, communication is established between the supply reservoir 23 and the straight air pipe 11, by way of supply pipe 35, past the unseated application valve 28, and pipe and passage 33.

The fluid pressure operated master switch device 13 may be embodied in a casing made of some electrically insulating material, as for example micarta or Bakelite. The casing is preferably so shaped as to hold firmly secured therein a flexible diaphragm 36, defining with the casing two pressure tight chambers 37 and 38. The chamber 37 is connected to the third section of a control pipe 40, while the other chamber 38 is connected to the aforementioned straight air pipe 11.

The diaphragm 36 has secured thereto, and insulated therefrom, two stems 41 and 42 which form part of release contacts 43 and application contacts 44, respectively.

The parts are so arranged that when the pressures in the two chambers 37 and 38 balance exactly, as when both chambers are at atmospheric pressure, the release contacts 43 are closed while the application contacts 44 are opened. When fluid under pressure is supplied to the chamber 37, the diaphragm 36 is flexed downwardly to thereby open release contacts 43 and to then close application contacts 44. When fluid under pressure is supplied to the chamber 38 and the degree of this pressure reaches a value slightly below the degree of the pressure in chamber 37, the diaphragm 36 will flex upwardly to open the application contacts 44 while at the same time holding the release contacts 43 also open. If the pressure in chamber 38 should exceed the pressure in chamber 37 the release contacts will, of course, be closed. It will thus be apparent that by controlling the pressures in the two chambers 37 and 38 the desired control of the release and application contacts may be effected.

The retardation controller device 14 is embodied in a casing having disposed therein a movable body or weight 46, which has attached thereto flanges 47 for supporting the weight or body on ball bearing rollers 48 secured to the casing. The weight or body 46 is therefore movable in a horizontal line. Engaging one end of the body 46 is a lever 49 which is pivotally mounted to the casing at 50, and has one end bifurcated to receive a roller 51 engaging the body 46. The other end of the lever 49 is similarly bifurcated to receive a roller 52 which engages one end of a slide valve 53 slidable in a bore 54 in the casing. A calibrated spring 55 acts upon the other end of the slide valve 53, and tends to bias the weight 46 to the position illustrated.

The retardation controller device is so positioned on the vehicle that when the vehicle is decelerating the resultant force of inertia urges the body 46 to the left, this movement being resisted by the calibrated spring 55. Since the force of inertia acting on the body 46 is proportional to the rate of deceleration, it follows that the degree to which the spring 55 is compressed will be proportional to the rate of deceleration.

With the slide valve 53 positioned as shown, it connects the second and third sections of the control pipe 40. When the slide valve 53 is shifted to the right, it will interrupt this communication, and when shifted still further to the right will connect the third section of the control pipe to an exhaust port 56. It will be apparent therefore that at one rate of deceleration the retardation controller will interrupt communication between the second and third sections of the control pipe, and at a higher rate of retardation will connect the third section of the control pipe to the exhaust port 56.

It will be observed that a one-way check valve device 58 is provided for by-passing the communication through the retardation controller device. As indicated by the arrow on this check valve device, fluid under pressure can flow through it from the third to the second section of the control pipe, but not in the reverse direction.

The triple valve device 15 may be considered as of conventional design, and for that reason it is not deemed necessry to describe the device in detail. It should be understood that its functions are the same as those of a standard triple valve device.

The automatic or emergency valve device 17 is embodied in a casing having slidably disposed therein a piston 60 which is subject on one side to the combined pressure of fluid in a chamber 61 and the pressure of a biasing spring 62, and subject on the opposite side to pressure of fluid in a slide valve chamber 63. The chamber 61 is connected to the brake pipe 16, so that this chamber is therefore at all times at brake pipe pressure. The chamber 63 is connected by pipe 64 to the main reservoir pipe 65, so that this chamber is at all times at main reservoir pressure.

When the brake pipe 16 is fully charged, the piston 60 will be positioned as shown, in which position a feed groove 59 will provide communication between the two chambers 61 and 63. Now the piston 60 is provided with a stem 57 which is recessed to receive and move coextensive with movement of the piston a slide valve 66.

In the position of the piston and slide valve as illustrated, which is the release position, a cavity 67 in the slide valve connects the first and second sections of the control pipe 40, and another cavity 68 in the slide valve connects a pipe 69, leading to the control switch device 19, to an exhaust port 70. The slide valve 66 is provided with two other ports 71 and 72 which at this time are blanked at the seat of the slide valve.

When the pressure in the chamber 61 is suddenly reduced, as by a reduction in brake pipe pressure, the overbalancing pressure in the chamber 63 will shift the piston 60 to its extreme upper position, in which position the slide valve 66 interrupts communication between the two sections of the control pipe, and the port 72 is brought into communication with a seat port 74 leading to the second section of the control pipe 40. The passage 74 contains a restriction 75 which limits the rate of flow of fluid to this section of the control pipe.

At the same time, the slide valve 66 interrupts communication between the pipe 69 and the exhaust port 70, and brings port 71 in registration with the seat passage connecting with the pipe 69, so that fluid under pressure is supplied from the chamber 63 to the pipe 69.

Upon restoration of pressure in the chamber 61 and brake pipe 16, the piston 60 moves back to its release position, as illustrated.

Considering now the control switch device 19, this device is embodied in a casing having disposed therein a piston 78, which is subject on one side to the pressure of fluid in a chamber 79 and on the other side to the pressure of a spring 80 disposed in a chamber constantly at atmospheric pressure. The chamber 79 is in open communication with the aforementioned pipe 69.

The piston 79 has secured thereto a stem which carries insulated therefrom a contact 81, adapted when the piston is in its lowermost position to engage stationary contacts 82. The spring 80 is so designed that when fluid at a low pressure is supplied to the chamber 79, the piston will be actuated upwardly to disengage contact 81 from the contacts 82.

Considering now the charging valve device 18, this valve device is embodied in a casing having a valve 84 in the form of a movable abutment subject on one side to the combined pressure of fluid in a chamber 85 and the pressure of a biasing spring 86, and on its other side having a composition valve 87 adapted to seat upon a seat rib 88, so that the area of the abutment exterior of the seat rib is exposed to the pressure of fluid in a chamber 89. The passage within the seat rib 88 is connected by a pipe 90 to the brake pipe 16, and in the pipe 90 is provided a choke or restriction 91, for limiting the rate of flow of fluid through this pipe. The chamber 89 is in open communication with the main reservoir pipe 65.

The charging valve also includes a double beat valve 92, which is urged toward an upper seated position by a spring 93 and which is adapted to be actuated to a lower seated position by an electromagnet 94 when energized. In its upper seated position, as illustrated, the double beat valve 92 opens communication between the chamber 89 and the chamber 85 by way of passage 95, past the open lower seat of the double beat valve, and passage 96. This results in main reservoir pressure, as well as the pressure of the spring 86, being exerted on the upper side of the valve 84, whereas main reservoir pressure is effective only on the area of the valve outside of the seat rib 88. The area of the valve within the seat rib 88 is subject to brake pipe pressure but the pressure acting to hold the valve seated is greater than that now acting to unseat the valve.

When the double beat valve 92 is shifted to its lower seated position, communication between chambers 89 and 85 is interrupted, and the chamber 85 is connected to the atmosphere by way of exhaust port 97. This results in releasing fluid under pressure from the chamber 85, so that the pressure acting to unseat the valve will predominate and thereby actuate the valve to unseated position. This opens communication between the main reservoir pipe 65 and the brake pipe 16, so that fluid under pressure may flow from the main reservoir pipe to the brake pipe, the rate of flow however being restricted by the presence of the choke or restriction 91.

The engineer's brake valve device 20 may be considered as being of conventional design, and for the purposes of illustration a brake valve of the rotary type had been illustrated. As shown in Fig. 2, when the brake valve handle 100 is in the release position, main reservoir pipe 65 is connected by port 101 to brake pipe 16, and, also, control pipe 40 is connected to an exhaust port or pipe 102 by a cavity 103.

When the brake valve handle is turned to the service position, the brake pipe 16 is disconnected from the main reservoir pipe, and the main reservoir pipe is connected by a port 104 to the control pipe 40. The brake pipe is therefore not maintained charged through the engineer's brake valve, but as will later appear is maintained charged through functioning of the charging valve device 18.

When the engineer's brake valve handle 100 is turned to the emergency position, the main reservoir is connected to the control pipe 40, as in the service position, and at the same time the brake pipe 16 is connected by cavity 105 to the exhaust port or pipe 102, so as to reduce the brake pipe pressure at an emergency rate.

After the brake valve handle 100 has been turned to either the service or emergency position, and the desired degree of application of the brakes effected, it may be turned to the lap position, as is usual practice.

The operation of this embodiment of my invention is as follows:

*Running condition*

When the vehicle is running under power, or is coasting, the brake valve handle 100 is maintained in the release position, in which position the brake pipe 16 is maintained charged from the main reservoir pipe 65. With the brake pipe 16 charged, the pressure in valve chamber 61 will be at brake pipe pressure, and the supply reservoir 23 will be charged from the brake pipe by way of one-way check valve device 106. Further, the auxiliary reservoir 24 will be charged from the brake pipe through the triple valve device 15 in the usual manner. The entire brake system will thus be charged and be made ready for a brake application.

With the system fully charged the parts will be in the positions as illustrated in Fig. 1, and the brakes will be released.

*Service application*

When it is desired to effect a service application of the brakes, the brake valve handle 100 is turned to the service position so as to supply fluid under pressure from the main reservoir pipe to the control pipe, and when the desired degree of pressure has been established in the control pipe the brake valve handle is then turned to the lap position. Fluid under pressure supplied to the control pipe flows through the automatic or emergency valve device 17, and the retardation controller device 14, to the chamber 37 in the master switch device 13.

Fluid pressure in the chamber 37 flexes the diaphragm 36 downwardly to open the release contacts 43 and close the application contacts 44.

When the release contacts 43 were closed they established communication between a battery 110 and the release wire 26, so that the release electromagnet 30 in each application and release magnet valve device 12 was energized. Therefore, when the release contacts 43 opened, the release electromagnets were deenergized, and each release valve 27 was seated by its spring 29.

When the application contacts 44 are closed, the battery 110 is connected to the application conductor 25, so that each application electromagnet 32 is energized. In each application and release magnet valve device 12 the application valve 28 is thus actuated to unseated position, so as to supply fluid under pressure from the supply reservoir 23 to the straight air pipe 11. As straight air pipe pressure increases the pressure in chamber 38 also increases, and when the pressure in chamber 38 is slightly below that in chamber 37, the diaphragm 36 will flex upwardly to open the application contacts 44 while at the same time holding the release contacts 43 open. The supply of fluid under pressure to the straight air pipe 11 will thus be lapped.

Fluid under pressure supplied to the straight air pipe 11 flows to the brake cylinder 10 by way of a conventional type double check valve device 111. This check valve device opens communication between the straight air pipe 111 and the brake cylinder 10, while closing communication to a pipe 112 leading to the triple valve device 15. The brakes will thus be applied to a degree according to the degree of pressure established in the straight air pipe.

Now when the application conductor 25 is energized, the charging valve electromagnet 94 is also energized and shifts the double beat valve 92 to lower seated position. As before described, this results in venting the chamber 85 above the valve 84, and the valve 84 is thus unseated to open communication between the main reservoir pipe 65 and the brake pipe 16. Since the charging communication through the engineer's brake valve device 29 is interrupted while the engineer's brake valve handle is in either application position, or in the lap position, it follows that the charging valve establishes the only communication for maintaining the brake pipe charged.

This charging will, of course, continue so long as the application conductor 25 is maintained energized. When the brake application is lapped this conductor is deenergized, and in order that the charging of the brake pipe will continue, the electromagnet 94 of the charging valve is selected as of the slow releasing type. That is to say, as in conventional magnet valves of the slow release type, a definite interval of time will elapse between the deenergization of the electromagnet and the shifting of the double beat valve 92 to its upper seated position. Thus the brake pipe will continue to be maintained charged for a definite interval of time following deenergization of the application conductor 25.

When the brakes are applied and the train begins to decelerate, the retardation controller device will at a definite rate of retardation shift its slide valve 53 to the position where communication between the second and third sections of the control pipe is blanked, and will at a higher rate of retardation connect the third section of the control pipe to the exhaust port 56. This will, of course, reduce the pressure in the chamber 37, which as is well known to those skilled in the art and familiar with "HSC" equipment, results in a reduction in the degree of application of the brakes. As is further well known to those skilled in the art, the retardation controller device will throughout the deceleration period continue to effect intermittent reductions in the pressure in chamber 37, and thereby operate to maintain a substantially constant rate of deceleration of the train. It is therefore not deemed necessary to elaborate further on the functioning of the retardation controller device, as it is not a primary part of the present invention.

When it is desired to manually effect a release of the brakes following a service application, the brake valve handle 100 is turned to the release position, in which position fluid under pressure is released from the control pipe 40, and the switch chamber 37, so as to effect a full release of the brakes. In the event that a release is made at the time the retardation controller slide valve 53 blanks communication between the second and third sections of the control pipe, the release from chamber 37 may be effected by way of the one-way check valve device 58, as will be apparent.

*Emergency application*

When it is desired to effect an emergency application of the brakes, the brake valve handle 100 is turned to the emergency position, in which position the main reservoir pipe 65 is connected to the control pipe 40, and the brake pipe 16 is connected to the atmospheric passage or pipe 102, so as to reduce brake pipe pressure at an emergency rate.

When the brake pipe pressure is thus reduced, piston 60 in the automatic or emergency valve device 17 moves to its extreme uppermost position, shifting the slide valve 66 to application position. In application position the slide valve 66 blanks communication between the first and second sections of the control pipe 40, and at the same time opens communication between the chamber 63 and the second section of the control pipe 40, by way of the restriction 75.

It is intended that the slide valve 66 will be shifted to application position before sufficient fluid under pressure has been supplied from the brake valve device to the switch chamber 37, so that before the application conductor 25 will have been energized, fluid under pressure will be supplied from chamber 63 to the chamber 79 of the control switch device 19, by way of port 71 in slide valve 66, and pipe 69. Fluid at a low pressure supplied to the chamber 79 actuates piston 78 upwardly to disengage contact 81 from contacts 82. Therefore, when fluid under pressure is subsequently supplied to the switch chamber 37, by shifting of the emergency slide valve 66 to application position, the charging electromagnet 94 will not be energized. Thus the charging communication established during a service application is not established when an emergency application is effected. This prevents a loss of fluid which would otherwise result if the charging communication were maintained opened while the brake pipe was being vented to the atmosphere.

Fluid under pressure supplied to the chamber 37 will of course actuate the master switch device as before described for a service application, except that pressure is now supplied to the chamber 37 to a maximum degree.

When the pressure in the brake pipe is reduced at an emergency rate, the triple valve device 15 on each car moves to emergency application position, and supplies fluid under pressure from the auxiliary reservoir 24 to the double check valve device 111, in the usual manner. The double check valve device 111 will therefore be subject on one side to the pressure of fluid in the straight air pipe 11, and on the other side to the pressure of fluid supplied by the triple valve device 15. In general, the triple valve device will establish a predominate pressure first, so that the brakes will be promptly applied, but subsequently the pressure developed in the straight air pipe 11 will exceed that which can be established by supply from the triple valve device, so that while the application may be initiated as an automatic application it will finally develop into a straight air application, and of course be subject to control by the retardation controller as during a service application.

When it is desired to manually release the brakes following an emergency application, the brake valve handle 100 is turned to the release position, in which position fluid under pressure is again supplied to the brake pipe to effect charging thereof, and at the same time fluid under pressure is released from the control pipe to the atmosphere.

In the event that the piston 69 of the automatic or emergency valve device 17 should not move to its application position promptly enough to prevent fluid under pressure being supplied from the brake valve device to the switch chamber 37 to a degree sufficient to effect energization of application conductor 25, and the charging electromagnet 94 should be energized before the switch device 19 has opened its contacts 81 and 82, undue loss of fluid pressure which might result if charging the communication were maintained fully opened, is prevented by the presence of the choke or restriction 91. This choke or restriction not only prevents an undue loss of fluid, but prevents the flow of fluid from the main reservoir pipe to the brake pipe at a rate sufficiently rapid to prevent the propagation of the brake pipe reduction throughout the train.

*Embodiment of Fig. 3*

This embodiment comprises the inter-position of a valve device between the charging valve device 18 and the brake pipe 16, the new valve device being of such a design as to be readily incorporated in the casing of the charging valve device. As seen in Fig. 3, this valve is shown at 120 and is subject on its uppermost side to pressure of fluid in a chamber 121 and on its lowermost side to the combined pressure of fluid in a chamber 122 and the pressure of a biasing spring 123. The valve is adapted to seat upon a seat rib 124, the inside of which is connected to the pipe 90 leading to the brake pipe 16.

Chamber 121 is connected to the aforementioned pipe 69, and when the automatic or emergency valve device 17 is in release position, the chamber is connected to the atmosphere and is thus maintained at atmospheric pressure. Under these conditions the combined pressure of spring 123 and the pressure of fluid in the brake pipe 16 maintains the valve 120 unseated. Charging valve 18 is thus effective during a service application of the brakes to maintain the brake pipe 16 charged, as described for the previous embodiment.

When, however, brake pipe pressure is reduced at an emergency rate and the emergency valve device 17 moves to application position, fluid at main reservoir pressure is supplied to the chamber 121. With main reservoir pressure in the chamber 121 the force tending to hold the valve seated is greater than the force tending to unseat the valve, so that communication cannot be established between the main reservoir pipe 65 and the brake pipe 16, even though the charging valve electromagnet 94 is energized. It follows therefore that during an emergency application, when both the straight air and automatic portions are operative, brake pipe pressure can be reduced without the maintaining effect of the charging communication, or the loss of fluid which would thereby result.

*Embodiment of Fig. 4*

The embodiment of Fig. 4 consists essentially in having the communication between the charging valve device 18 and the brake pipe pass through the automatic or emergency valve device 17. This is done by connecting the pipe 90 to a passage 130 leading to the seat of the slide valve 66 in the emergency valve device. When the slide valve 66 is in the release position, as illustrated in Fig. 4, a cavity 131 in the slide valve connects the pipe 90 and passage 130 to a pipe and passage 132 leading to the brake pipe 16.

When the brake pipe pressure is reduced at an emergency rate, so as to cause the slide valve 66 to be shifted to application position, the communication between the pipes 90 and 132 is interrupted, so that although the charging valve device 18 is energized, the communication is not completed between the main reservoir pipe 65 and the brake pipe.

*Summary*

From the foregoing description, it will be seen that I have provided a brake equipment in which applications of the brakes may be effected by either automatic operation or by straight air operation, and that during applications effected by straight air operation, the charging valve device establishes a communication for maintaining the brake pipe of the automatic portion charged, and when emergency applications are effected and both the automatic and straight air portions are effective, the charging communication which would normally be established by the charging valve is maintained closed. Thus not only is fluid under pressure conserved, but the desirable rapid rate of propagation in brake pipe reduction is fully realized.

It will, of course, be apparent to those skilled in the art that many changes and modifications may be made in the several embodiments disclosed, and it is not my intention to be limited to the exact details of these embodiments, nor otherwise than according to the spirit and scope of the appended claims.

Having now described my invention, what I claim as new and desire to secure by Letters Patent, is:

1. In a vehicle brake system, in combination, means for effecting an application of the brakes by straight air operation, means including a normally charged brake pipe and operable upon a reduction of pressure in said brake pipe for effecting an application of the brakes by automatic operation, brake valve means for effecting the operation of said straight air means when effecting a service application of the brakes and both said straight air means and said automatic means when effecting an emergency application of the brakes, means effective to establish a communication through which fluid under pressure may flow to said normally charged pipe whenever said straight air means is operated, and preventing means operable when both said straight air and automatic means are operated for preventing the establishment of said communication, said straight air means being unaffected by operation of said preventing means.

2. In a vehicle brake system, in combination, electropneumatic means for effecting a service application of the brakes, automatic means including a normally charged pipe and operable upon a reduction of pressure in said pipe for effecting an emergency application of the brakes, means effective whenever said electropneumatic means is operated for establishing a communication through which fluid under pressure may flow to said normally charged pipe, and means operable when both said automatic and electropneumatic means are operated for preventing the establishment of said communication, the effectiveness of said straight air means being unaffected thereby.

3. In a vehicle brake system, in combination, an electric brake application circuit which is energized when effecting a service application of the brakes, a normally charged pipe in which the pressure is reduced to effect an emergency application of the brakes, means operable when said circuit is energized to establish a communication through which fluid under pressure may flow to said normally charged pipe, and means operable when an emergency application of the brakes is initiated for preventing said last means establishing said communication, said brake application circuit being unaffected by operation of said last recited means.

4. In a vehicle brake system, in combination, an electric circuit, a first electroresponsive means operable when current is supplied to the said circuit to effect an application of the brakes, a normally charged pipe, means operable upon a reduction of pressure in said pipe for also effecting an application of the brakes, a second electroresponsive means also operated when current is supplied to said circuit for opening a communication through which fluid under pressure is supplied to said pipe, and means operable when fluid under pressure is vented from said pipe substantially simultaneously with the supply of current to said circuit for preventing effective operation of said second electroresponsive means only to prevent the establishment of said communication.

5. In a vehicle brake system, in combination, two electroresponsive valve devices adapted to be energized simultaneously, one of said valve devices being operable when energized to effect an application of the brakes, the other of said valve devices being operable when energized to establish a communication through which fluid under pressure is supplied to a normally charged pipe, means operated upon a reduction of pressure in said normally charged pipe for also effecting an application of the brakes, and means operable to reduce the pressure in said pipe at a rate faster than fluid under pressure can be supplied to said pipe through said communication.

6. In a vehicle brake system, in combination, a brake cylinder, an electroresponsive means operable to supply fluid under pressure to said brake cylinder, a normally charged pipe, means operable upon a reduction of pressure in said pipe to also effect a supply of fluid under pressure to said brake cylinder, a second electroresponsive valve means operable simultaneously with said first electroresponsive valve means to open a communication through which fluid under pressure is supplied to said normally charged pipe, and means operable in response to a reduction of pressure in said normally charged pipe for preventing the operation of said second electroresponsive valve means only to thereby prevent the establishing of said communication.

7. In a vehicle brake system, in combination, a brake cylinder, an electric circuit, a normally charged pipe, electroresponsive valve means operable upon supply of current to said circuit for effecting a supply of fluid under pressure to said brake cylinder, valve means operable upon a reduction of pressure in said normally charged pipe for also effecting a supply of fluid under pressure to said brake cylinder, a fluid pressure operated switch device for effecting a supply of current to said circuit, a second electroresponsive valve means also operable upon supply of current to said circuit for establishing a communication between a source of fluid under pressure and said normally charged pipe, and means operable upon a reduction of pressure in said pipe for preventing the operation of said second electroresponsive valve means only to prevent establishing said communication.

8. In a vehicle brake system, in combination, an electric brake application circuit to which current is supplied to effect a service application of the brakes, a normally charged pipe in which the pressure of fluid is reduced to effect an emergency application of the brakes, electroresponsive valve means operable when current is supplied to said circuit for opening a communication through which fluid under pressure is supplied to maintain said pipe charged, a switch device operated upon a variation of pressure therein to open the circuit to said electroresponsive valve means, and means for varying the pressure in said switch device when effecting an emergency application of the brakes, said switch device being ineffective to open said brake application circuit.

9. In a vehicle brake system, in combination, an electric brake application circuit to which current is supplied to effect an application of the brakes, a normally charged pipe in which the pressure of fluid is reduced to effect an emergency application of the brakes, a magnet valve device operable upon supply of current to said circuit to open a communication through which fluid under pressure is supplied to said normally charged pipe, a valve device operable upon a reduction of pressure in said pipe, and a switch device operable in response to operation of said valve device for opening the circuit to said magnet valve device without opening the brake application circuit.

10. In a vehicle brake system, in combination, a normally charge pipe, automatic means operable upon a reduction of pressure in said pipe to effect an application of the brakes, an electric circuit adapted to have current supplied thereto to also effect an application of the brakes, an electroresponsive valve device operable when current is supplied to said circuit for opening a communication through which fluid under pressure is supplied to maintain said normally charged pipe charged, and an independent valve device subject to both the pressure in said normally charged pipe and a regulatory pressure for controlling said communication independently of operation of said electroresponsive valve device.

11. In a vehicle brake system, in combination, a normally charged pipe in which the pressure of fluid is reduced to effect an emergency application of the brakes, an electric circuit to which current is supplied to effect a service application of the brakes, a magnet valve device operable when current is supplied to said circuit to open a communication through which fluid under pressure is supplied to said pipe to maintain it charged, a movable abutment subject on one side to the pressure of fluid in said normally charged pipe and on the other side to the pressure of fluid in a control chamber for also controlling said communication independently of operation of said magnet valve device.

12. In a vehicle brake system, in combination, a normally charged pipe, means operated upon a reduction of pressure in said pipe for effecting an application of the brakes, an electric circuit, means operated upon supply of current to said circuit to also effect an application of the brakes, an electrical valve device also operated upon supply of current to said circuit for opening a communication through which fluid under pressure is supplied to said pipe, and a valve device subject to the pressure of fluid in said pipe and to the pressure of fluid in an adjacent chamber, and operable upon supply of fluid under pressure to said chamber to close said communication whether or not said electrical valve device is operative.

13. In a vehicle brake system, in combination, a brake cylinder, a normally charged pipe, an electric circuit, means operated upon a reduction of pressure in said pipe for effecting supply of fluid under pressure to said brake cylinder to effect an emergency application of the brakes, means operated upon a supply of current to said circuit for effecting a supply of fluid under pressure to said brake cylinder to effect a service application of the brakes, an electrical valve device operated upon supply of current to said circuit for opening a communication through which fluid under pressure is supplied to said pipe, an emergency valve device also operated upon a reduction of pressure in said pipe, and valve means responsive to the operation of said emergency valve device for effecting closing of said communication independently of operation of said electrical valve device.

14. In a vehicle brake system, in combination, a normally charged pipe, means operated upon a reduction of pressure in said pipe for effecting an emergency application of the brakes, separate means for effecting a service application of the brakes, a valve device operated when a service application is effected for opening a communication through which fluid under pressure is supplied to said pipe, and means operable independently of said valve device and controlled by the pressure in said pipe for also controlling said communication.

15. In a vehicle brake system, in combination, a brake pipe, means operated upon a reduction of pressure in said brake pipe for effecting an application of the brakes, an electrical valve device for controlling a communication through which fluid under pressure is supplied to said pipe, and an automatic valve device for also controlling said communication in series with said electrical valve device.

16. In a vehicle brake system, in combination, a brake cylinder, a normally charged pipe, a normally discharged pipe, means operated upon a reduction of pressure in said normally charged pipe for effecting an emergency application of the brakes, means operated upon supply of fluid under pressure to said normally discharged pipe for effecting a service application of the brakes, valve means operable in response to supply of fluid under pressure to said normally discharged pipe for opening a communication through which fluid under pressure is supplied to said normally charged pipe, and an automatic valve device controlled by the pressure of fluid in said normally charged pipe for controlling said communication independently of said valve means, and operable upon a reduction of pressure in said normally charged pipe for closing said communication.

17. In a vehicle brake system, in combination, a normally charged pipe, a normally discharged pipe, means operated upon a reduction of pressure in said normally charged pipe for effecting an application of the brakes, means operated upon a supply of fluid under pressure to said normally discharged pipe for also effecting an application of the brakes, charging valve means responsive to the supply of fluid under pressure to said normally discharged pipe for opening a communication through which fluid under pressure is adapted to be supplied to said normally charged pipe, and valve means controlled by the pressure of fluid in said normally charged pipe and operable independently of said charging valve means to control both said last mentioned communication and communication to said normally discharged pipe.

ELLIS E. HEWITT.